(No Model.)
A. GLENN.
COMBINED PLOW AND SEEDER.
No. 322,595. Patented July 21, 1885.
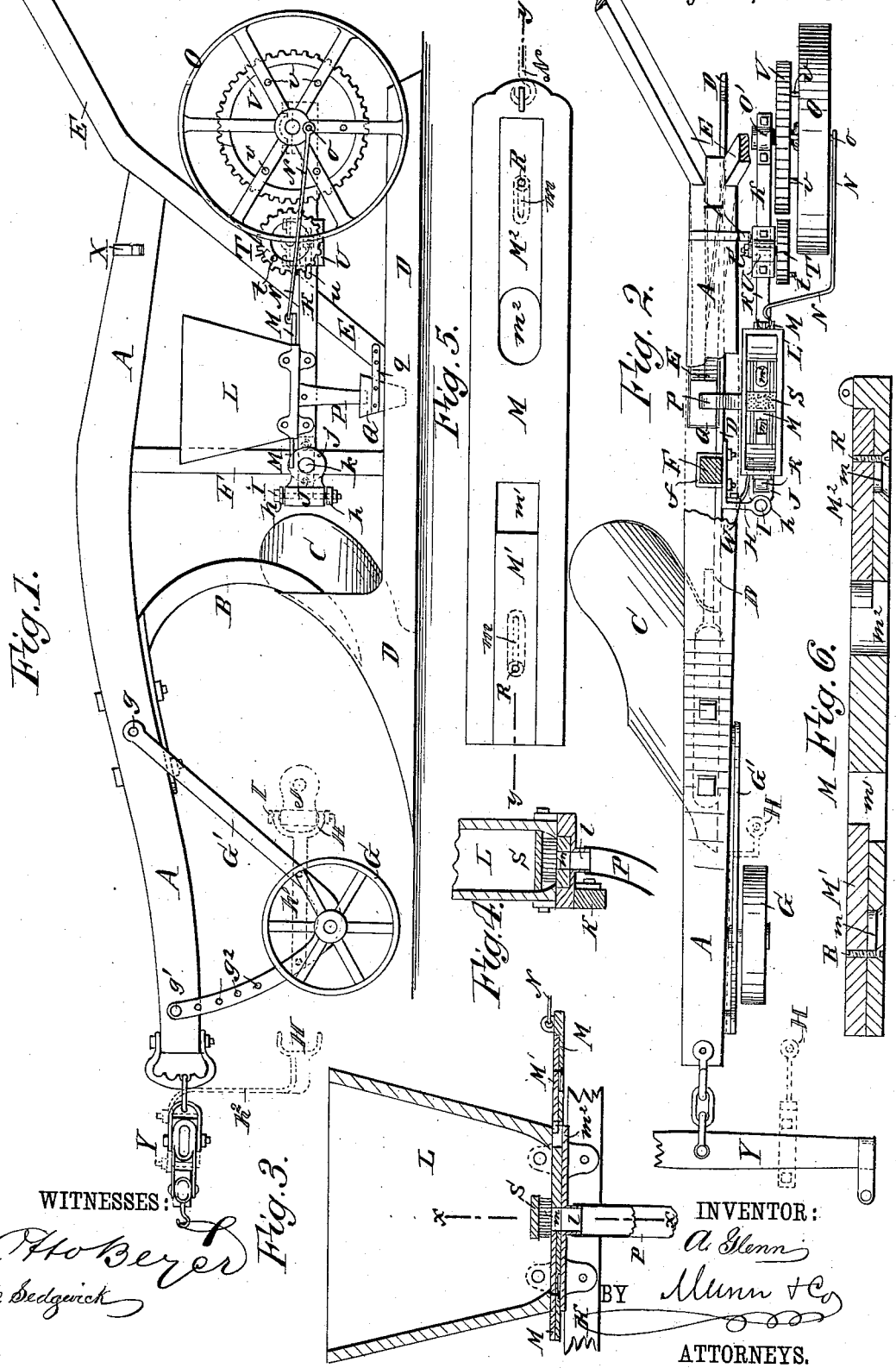
WITNESSES:
Otto Beyer
C. Sedgwick
INVENTOR:
A. Glenn
BY Munn & Co
ATTORNEYS.

UNITED STATES PATENT OFFICE.

ALLEN GLENN, OF REE HEIGHTS, DAKOTA TERRITORY.

COMBINED PLOW AND SEEDER.

SPECIFICATION forming part of Letters Patent No. 322,595, dated July 21, 1885.

Application filed August 20, 1884. (No model.)

*To all whom it may concern:*

Be it known that I, ALLEN GLENN, of Ree Heights, in the county of Hand and Territory of Dakota, have invented a new and Improved Combined Plow and Seeder, of which the following is a full, clear, and exact description.

The object of my invention is to provide a simple and efficient combined plow and seeder, whereby hitherto unbroken soil more particularly may be plowed and planted at the same time.

The invention consists in the construction and arrangement of parts, as will be hereinafter fully described and claimed.

Reference is to be had to the accompanying drawings, forming part of this specification, in which similar letters of reference indicate corresponding parts in all the figures.

Figure 1 is a side elevation of my improved plow and seeder. Fig. 2 is a plan view thereof partly broken away. Fig. 3 is a longitudinal section through the seed-hopper and dropping-slide. Fig. 4 is a detail cross-section taken on the line $x\,x$ Fig. 3. Fig. 5 is a plan view of the seed-dropping slide, drawn to a larger scale, and Fig. 6. is a longitudinal section through the slide on the line $y\,y$ Fig. 5.

The letter A indicates the beam, B the standard, C the mold-board, D the landside, and E the handles, of a plow suitably constructed for opening furrows in new land. The handles extend from the back end of the beam to the landside, to brace it, and a post or standard, F, connecting the beam and the landside, makes an additional brace to the latter and affords a means of attaching the seeder, as presently explained.

G is the forward guide-wheel, which is journaled in a frame, G', pivoted on a pin, $g$, to the beam A, and attached at its other end to the beam by a pin, $g'$, which may be passed through any one of a series of holes, $g^2$, for holding the guide-wheel at any desired height to govern the depth of the furrow.

To the post F, I attach, by suitable clip irons, $f$, the yoke H, which is bent sidewise and forked at the outer end, as at $h\,h$, and between these arms $h\,h$ I pivot on a vertical bolt or pin, I, the head J, which is slotted at the back part to form flanges or check-pieces $j\,j$, to and between which is pivoted on a horizontal pin or stud, $k$, the bar K, which extends backward a sufficient distance to support the seed-hopper L and the mechanism for operating the dropping-slide M, which slide is fitted in the floor of the hopper and may connect by a pitman, N, with the drop-wheel O, which is journaled in bearings O' on the bar K and runs on the land beside the plow.

It will be seen that the double hinge-joint at the front of the seeder-bar K allows said bar to swing sidewise with the head J on the pivot I, and that the bar K also is free to rock up and down on the pivot $k$ to allow the drop-wheel O always to run on the ground, no matter how the plow may be shifted about when at work, and leaving the wheel O free to rise and fall in passing over roots or clods of earth; hence the drop-wheel will move the slide M with regularity to drop the seed through a hole, $l$, in the hopper-bottom, and a rubber or other flexible conveyer-tube, P, held to the hopper, into a funnel or receiver, Q, which is held to the landside D or the handle E by straps $q$, and through which funnel the seed falls to the ground.

The hopper-bottom and the seed-dropping slide may have any preferred arrangement of seed-dropping apertures; but I have constructed the slide M with the two plates M' M², which are fitted to slide in lengthwise slots made in the upper face of the slide M, said slots being cut through at the inner ends to form the apertures $m'\,m^2$, into and through which the seed may pass for delivery to the tube P.

I pass from the under side and through slots $m\,m$ in the slide the screws R, which enter the plates M' M², and the slots through which the screws pass are beveled or countersunk at the outsides, to keep the heads of the screws flush with or beneath the bottom of the slide which moves along the hopper-bottom.

I prefer to make the inner end of the seed-hole $m'$ square, so that the square end of the plate M' may be set to entirely close the hole $m'$ when but one drop of seed is to be made for each revolution of the drop-wheel, and I prefer to make the hole $m^2$ rounding at the inner end, so that the reversely-curved inner end of the slide M² may form with it an approximately round or oval seed-pocket, which is always to be used, and through which the seed may pass freely.

Both the holes $m'$ $m^2$ may be made larger or smaller, to deliver a greater or less quantity of seed, by shifting the plates $M'$ $M^2$ in the slide M, as will readily be understood.

Any suitable seed cut-off may be fixed in the hopper over its discharge-hole $l$; but I show and prefer the brush cut-off S.

At T is shown a spur-gear wheel, which is held to a shaft journaled in a bearing box or saddle, U, which is fitted on the bar K, so as to be slid along the bar, and fastened by a screw, $t'$, passing through a slot, $u$, in the bar, so that the gear-wheel T may be set either into or out of gear with a gear-wheel, V, fastened by studs $v$, or otherwise, to the drop-wheel O.

The object of the gears V T is to enable the planting to be done more closely, as presently described.

When the drop-wheel O, which preferably is thirty-six inches in circumference, is connected by its wrist-pin $o$ and the rod N to the slide M, and when the seed-aperture $m'$ of the slide is closed, but one drop of seed will be made through hole $m^2$ for each revolution of the wheel O, and when both holes, $m'$ and $m^2$, are open, two drops of seed will be made, allowing the seed to be planted in hills thirty-six and eighteen inches apart, respectively, and to plant closer the rod N will be disconnected from the slide M and wheel O, and the gear-wheel T will be set to mesh with the gear V, and a shorter pitman or rod will be used to connect the wrist-pin or crank $t$ of the wheel T with the dropping-slide M, which, by setting the slide-plate $M'$ in or out, will allow the seed to be planted in hills twelve and six inches apart, respectively, as will readily be understood.

The relative sizes of the wheels O V T may of course be varied to space the planting as desired.

A spring, as at W, may be fixed to the post F to bear against the bar K or its head J to hold the seeder in proper relative position to the plow or furrow cut by the plow.

As represented in the drawings, the funnel Q is arranged to drop the seed into the furrow, so that the next furrow-slice turned over by the plow shall cover it; but it is evident that the tube P, instead of being bent over to enter the funnel Q, may be allowed to hang straight down from the seed-hopper for delivering the seed on the unplowed land, so that the seed will be turned over with and covered by the next furrow-slice turned over by the plow.

To prevent the dropping of seed, I fix a hook, X, to the plow beam or handle, on which the drop-wheel O may be hung to hold it from the ground; or the seeder may be removed from the plow by taking out the pin I.

It is not essential that the yoke H be connected to the standard F behind the mold-board of the plow, as said yoke may have an extended arm, $h'$, for connecting it to the frame $G'$ of the guide-wheel G, as in dotted lines in Figs. 1 and 2; or the yoke may connect by a bent arm, $h^2$, with the double-tree also, as indicated in dotted lines, whereby the seeder will be drawn by the plow or its draft attachments.

It is evident that my improved machine may be used for planting corn and a variety of other seeds requiring to be planted at greater or less distances apart.

Having thus described my invention, what I claim as new, and desire to secure by Letters Patent, is—

In a seeding attachment, the bar K, the head J, and yoke H, pivotally connected to the forward end of said bar, the seed-hopper, its slide, the hopper-wheel O, having a wrist-pin, $o$, a connecting-rod, a gear-wheel, V, connected to the inner side of said hopper-wheel, and the gear-wheel T, adjustably mounted on the bar K between the gear V and the seed-slide, and provided with a wrist-pin, $t$, whereby, when it is desired to increase the number of hills, the wrist-pin $o$ may be disconnected from the seed-slide and the same be operated from the gears T V, as described.

ALLEN GLENN.

Witnesses:
GEO. W. CLAYTON,
FRED C. CLAYTON.